UNITED STATES PATENT OFFICE.

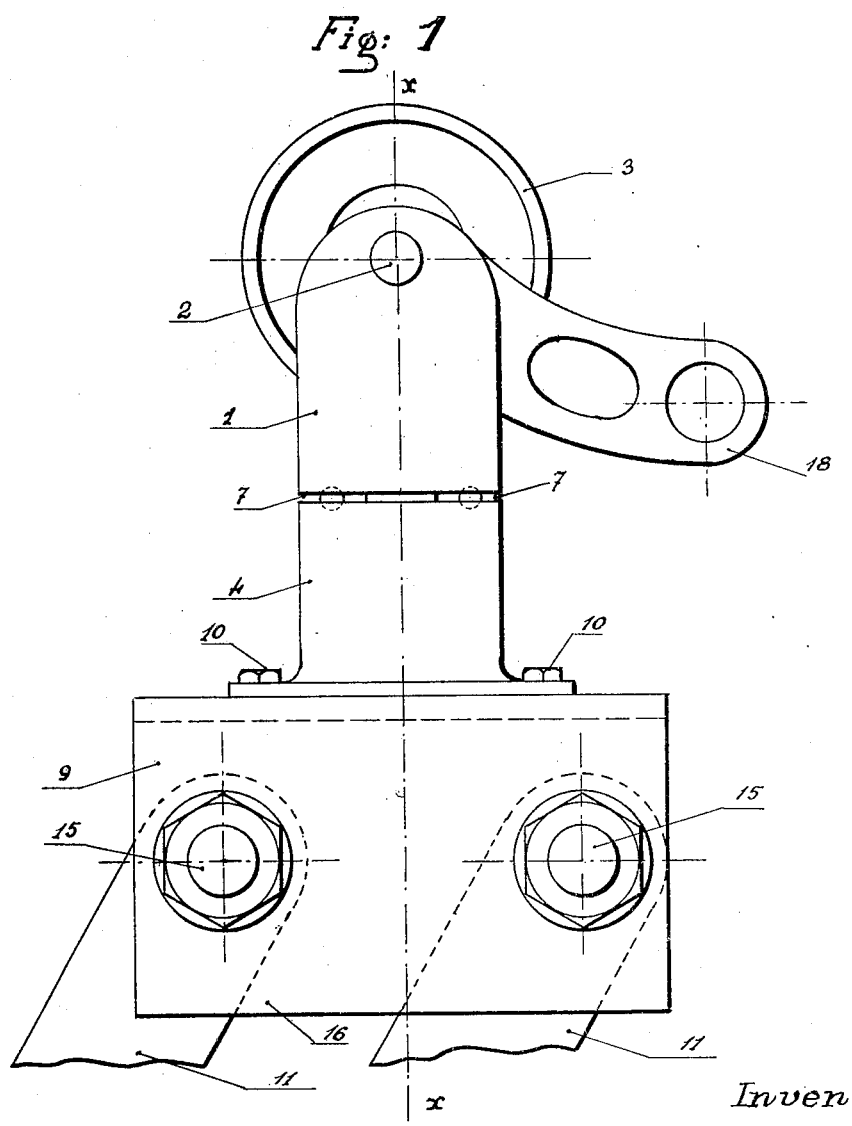

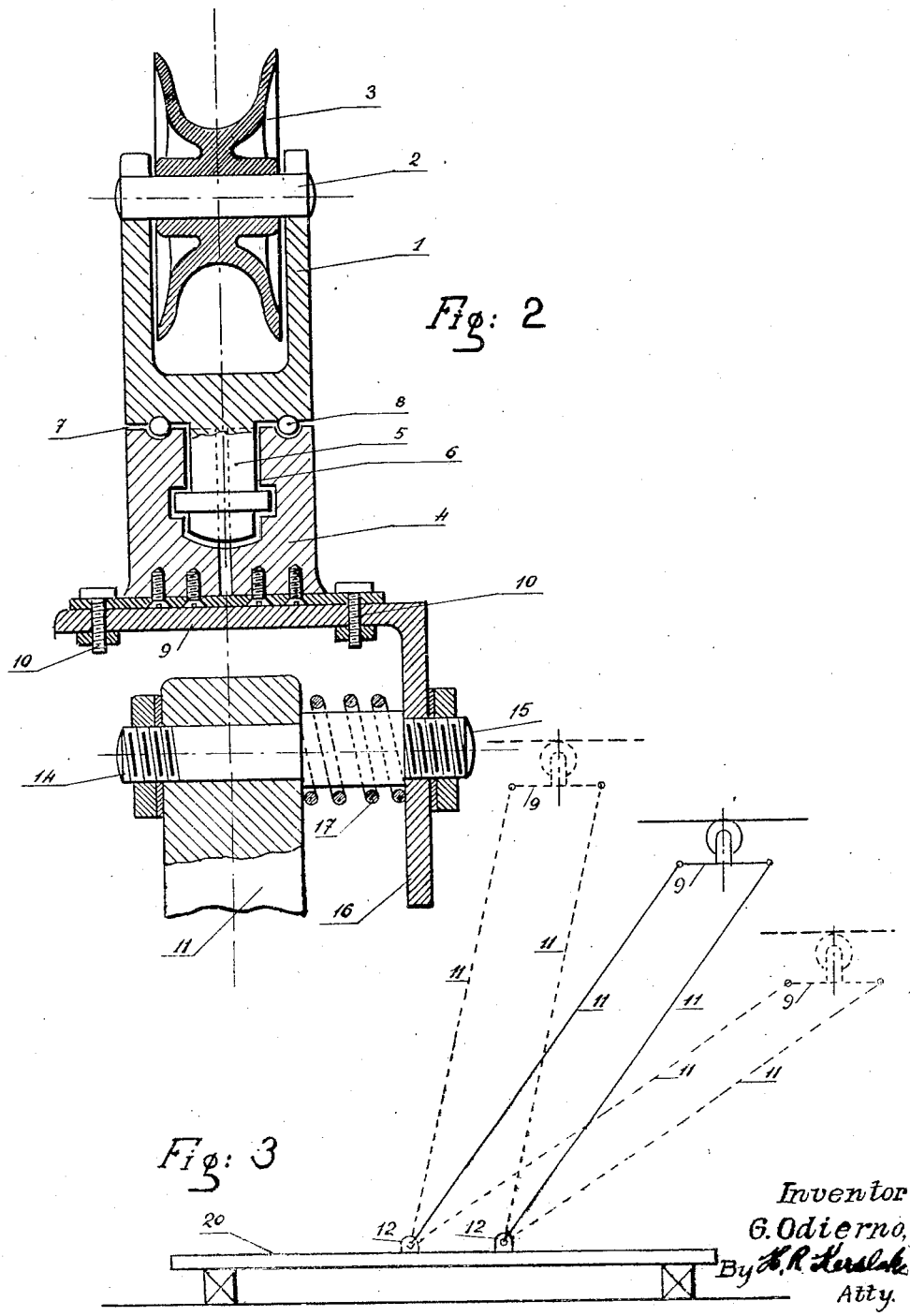

GIOVANNI ODIERNO, OF MILAN, ITALY.

TROLLEY FOR ELECTRIC TRAMWAYS.

1,354,060.  Specification of Letters Patent.  Patented Sept. 28, 1920.

Application filed June 26, 1919. Serial No. 306,973.

*To all whom it may concern:*

Be it known that I, GIOVANNI ODIERNO, captain, Milan, via Bigli 19, Italy, have invented certain new and useful Improvements in Trolleys for Electric Tramways, of which the following is a specification.

This invention relates to improvements in roller contact devices as used in connection with electric tramways driven from overhead wires and more particularly to a device of the type comprising a deformable parallelogram mounted on the roof of the car, rollers with forked supporting members and means to connect said forked supports on the upper side of said parallelogram.

The object of the invention is to provide a device simple in construction and efficient in action, capable of securing continuous contact, and avoiding the jumping off of the roller as it passes around or over angles in the overhead lines or wires.

The invention consists in mounting a single roller on a system of rods forming the sides of a deformable parallelogram, said roller being pivotally arranged on the center of a plate kept constantly parallel to the line, said plate having a lateral wing projection pivoted to the upper ends of said rods with intermediate friction springs.

The invention will be now described with reference to the accompanying drawings, in which—

Figure 1 is a side elevation of the upper part of the device.

Fig. 2 represents a section on line —X—X— of Fig. 1.

Fig. 3 shows a diagrammatic view of the arrangement of the device on a car.

The same reference numerals designate like parts throughout the drawing.

The forked member —1— supporting the spindle —2— of roller —3— is rotatably mounted on the base —4— by means of pivot —5—, said pivot being journaled in recess —6—, the axis of which is normal to the plane —7— of said base. In order to permit the mounting of the pivot, said base may be obviously formed in two parts.

In order to reduce friction a ball bearing —8— is mounted between said support —1— and the base —4—, and the latter is carried on angle plate —9— by means of bolts —10—.

Plate —9— forms one end of a deformable parallelogram comprising rods —11— of the same length, the other end being stationary and constituting a portion of the car roof comprised between the joints —12— of the lower ends of said rods.

Said joints are similar to those of ordinary trolleys, and provided with suitable springs to keep them in tension against the line.

The upper ends of rods —11— are pivoted to the end —9— by means of bolts —14—, through the medium of the plate —16—. —17— is a friction spring on each of the bolts —14—.

The position of the device as shown in dotted lines in Fig. 3 shows how pivot —5— keeps vertical in spite of the different inclinations and deformations of the parallelogram.

—18— is a connecting link for a pulling rope, as generally used to pull the roller off the conducting wire.

Having now particularly described and ascertained the nature of my said invention and in what manner the same is to be performed, I declare that what I claim is—

In combination with a deformable parallelogram in a trolley device for electric cars, rods forming a part of the parallelogram and having the lower ends pivoted to the roof of the car, a plate forming a part of the parallelogram and having a lateral wing projection pivoted laterally to the upper ends of the rods, friction springs intermediate the wing projection and rods, a sectional support having a central socket, means for fastening the support centrally on said plate, a forked member having a downwardly extending pivot rotatably arranged in said socket, a seating on said support, ball bearings intermediate the seating and forked member, and a grooved roller mounted in said forked member.

In testimony whereof I have affixed my signature, in presence of two witnesses.

GIOVANNI ODIERNO.

Witnesses:
 O. P. WILSON,
 E. E. EVANS.